Nov. 29, 1955     G. FIRTH     2,725,219
REACTOR

Filed Feb. 16, 1953     2 Sheets-Sheet 1

INVENTOR.
GEORGE FIRTH
BY William W. Hayley

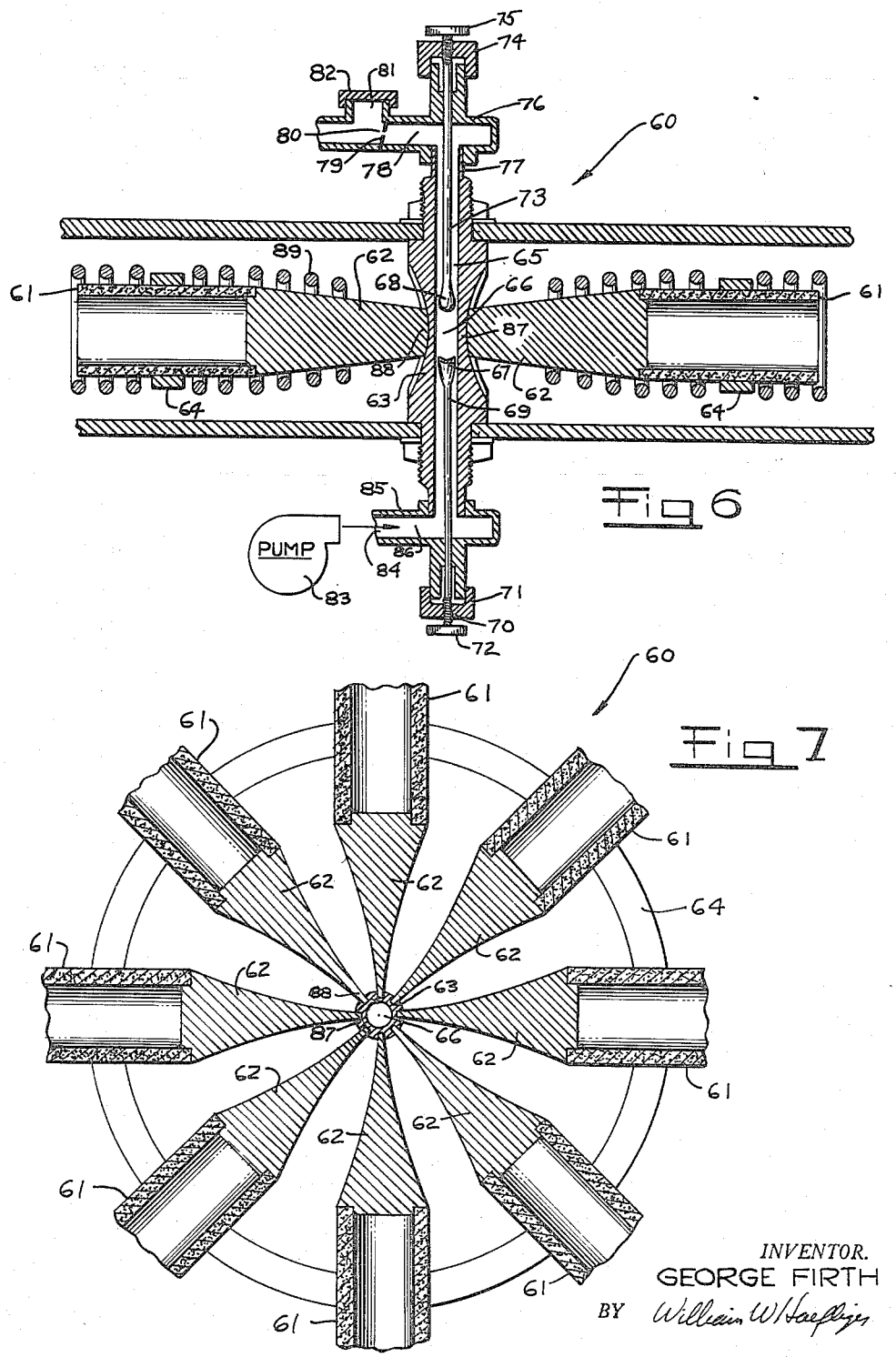

United States Patent Office 2,725,219
Patented Nov. 29, 1955

2,725,219

REACTOR

George Firth, Los Angeles, Calif.

Application February 16, 1953, Serial No. 336,930

32 Claims. (Cl. 259—1)

This invention relates to improvements in apparatus for sonic or ultrasonic wave energy treatment of chemical materials, and more particularly to means for concentrating large quantities of wave energy within a highly localized area in a fluid stream to facilitate chemical reactions or to change the physical state of fluid components.

It is an object of the invention to provide a novel reactor having a plurality of transducer elements spaced around a walled duct in such a way that a maximum amount of sonic or supersonic wave energy may be transmitted to the duct by the transducer elements and concentrated in a small zone within the duct.

It is another object of the invention to provide a sonic or supersonic reactor having novel means for increasing the amplitude of wave energy transmitted to a walled duct through which flows the material to be treated by the wave energy.

It is another object of the invention to provide a sonic or supersonic reactor having a novel tapered duct wall providing thin walled means for allowing the sound energy to penetrate to the interior of the duct, and thick walled means for assisting and increasing axial and radial oscillation of the duct wall during reactor operation.

It is another object of the invention to provide a sonic or supersonic reactor having a novel reaction chamber providing for continuous flow of a viscous or chamber providing for continuous flow of a viscous or fluid material through the chamber and for the maximum wave energy transfer to the material flowing through the chamber.

It is an object of the invention to provide a reactor having novel baffle means disposed within a reaction chamber, the baffle means providing for reflection of the wave energy concentrated within the reaction chamber so as to achieve resonance or near resonance conditions within the reaction chamber.

Other objects and advantages will become apparent from a consideration of the following description and the appended claims in conjunction with the accompanying drawings in which:

Figure 6 is a detailed cross-sectional view of a complete reactor apparatus; and Figure 7 is a view taken on line 7—7 of Fig. 6, illustrating one particular disposition of the transducer elements of the present invention.

Figure 1:
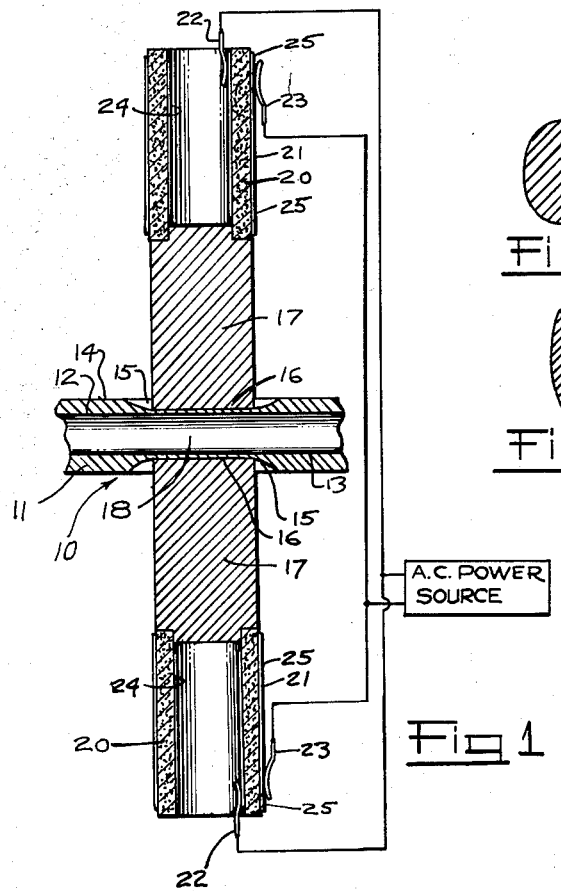
Figure 1 is a cross-sectional view taken through a reactor unit of the present invention.

The present invention is applicable to the introduction of controlled energy to a chemical reaction that is thermodynamically possible in such a way that a controlled reaction rate can occur in a fluid stream. Other applications of the present invention which can be obtained by varying the energy levels applied and the condition of the fluid stream to be treated are emulsification, de-emulsification, attrition, agglomeration, polymerization, depolymerization, gas absorption, gas separation, bacterial sterilization, and mixing to mention a few.

It has been common to apply heat energy to accelerate a thermodynamically possible chemical reaction, the heat energy providing the energy balance to make the reaction take place, or to accelerate a slow reaction. The amount of energy that can be applied in this manner, however, is limited in some cases by the vapor pressure of the reacting materials, the decomposition temperature, the occurrence of undesired side reactions, the thermal conductivity of the materials, and many other factors familiar to those skilled in the chemical engineering arts. Certain devices have been used to overcome or alleviate the difficulties mentioned above, such as the use of high pressures, thin fluid streams and short durations in the reaction zone, to mention a few. The energy that can be applied to a reaction by purely mechanical means such as agitators, pumps, and the like devices is relatively small and very limited in most cases because of low efficiency due to poor energy coupling and cavitation effects. The use of sound energy, however, can provide very high energy levels within small localized areas, the energy being capable of performing work on materials and being partly converted into heat energy. Alternate regions of adiabatic compression and rarefaction are set up, which move out from the source as waves, whose velocity is characteristic of the physical state and density of the absorbing medium.

If the pressure amplitude variation is high enough, and if dissolved gases or physical discontinuities exist in a liquid used as an absorbing medium, a phenomena known as cavitation can occur resulting in small local voids which collapse with very high velocities, producing extremely high pressure areas. The question as to whether the cavitation or pressure wave effects, are responsible for the changes observed in chemical reaction rates under the influence of sonic and ultrasonic fields, is still an unresolved question. The presence or absence of cavitation can be controlled by the amount of gas in the fluid, and by the use of high or low static pressures on the absorbing media. The relationship of hydrostatic pressure and other factors to cavitation, or gas bubble resonance can be expressed by the following equation:

$$f = \frac{1}{2\pi r}\sqrt{\frac{3\gamma}{\rho}\frac{P \cdot 2\sigma}{r}}$$

Where $\rho$=density of liquid; $\gamma$=ratio of specific heats of gas; $\sigma$=surface tension; $P$=hydrostatic pressure; and $r$=radius of gas bubble.

The practical application of high energy level sound waves to fluids has in the past been quite difficult due to acoustic impedance mismatch, and lack of suitable means to concentrate the energy in a small localized active zone through which the fluid stream can pass. A unit area of the sound generator surface can be likened to a piston travelling at a velocity equivalent to the velocity of the sound wave. If the area of the piston is small compared with the wave length of the sound wave, the fluid will simply slip off to one side without appreciable compression. If, however, the area of the sound source is large in relationship to the wave length of the sound wave, the medium will be compressed periodically by the movement of the wall. The energy stored elastically in this way travels away from the source wall as a wave. The ideal source would logically be the inside wall of a sphere, but the more logical configuration from a flow viewpoint would be a tube.

By causing the wall of a tube to oscillate symmetrically and radially, fluid passing through the tube will be acted upon by force pulsations in such a way as to develop high unit forces toward the center of the tube. The resultant forces are in the form of wave fronts moving along the tubular axis and in directions away from the source wall. Such wave fronts will tend to impel fluids in the tube along their natural flow path. The provision of suitable acoustic reflectors or baffles within the active portion of the tube cause the longitudinal waves in the fluid stream to perform further useful work on the fluid, and by making the cavity or reaction zone so formed of a length which is a function of the oscillation wave length, resonance can be attained or approached which will enhance the absorption of useful energy in the fluid.

Sonic generator sources of transducers contemplated for use in the present invention are of either the piezo-electric or magnetostrictive type, either of which is capable of being operated within the useful frequency range. The simplest configuration of such a device would be to make the wall of the tube itself the sound generator as is disclosed in U. S. Pat. #2,566,984, granted to George Firth. Such a construction while effective, is limited in power output by the heat generated in the tube due to electrical and other losses. The tubular wall oscillation amplitude is small and the possible transmitted energy to the fluid stream moderately low. To obtain higher energy levels within the tube, higher oscillation amplitudes at a resonant or near resonant frequency are desirable, since resonant conditions result in a large increase in the relationship between power input to mechanical energy obtained. When a tubular element is so excited as to oscillate radially, a longitudinal mode of oscillation also exists whose resonant frequency is a function of the length of the tube for a given material. With a cylinder of a length several times greater than its diameter, operated at a resonant frequency, a considerable motion can be obtained at the cylinder ends. By firmly attaching to the end of such a clyinder, the large end of a tapered horn, of a length approximating the cylinder length, and a contour approaching an exponential curve, a velocity and amplitude step up in the movement at the end of the cylinder can be obtained. The velocity step up with such a device will be in proportion to the ratios of the end diameters of the horn, and any values between one and one hundred are readily obtainable.

Thus a long tubular transducer element firmly attached to an exponentially tapered horn can be made to oscillate at resonance and produce a large high velocity and high amplitude motion at the tapered end of the horn. The high energy obtainable at the small end of such a horn can be made to perform useful work on a fluid stream by simple immersion in the stream, or by causing it to actuate a diaphragm in contact with the stream. If the tapered small end of the generator be attached normal to the wall of a tubular duct carrying the fluid stream, the wall will act as a diaphragm and transmit the acoustic energy to the fluid, a maximum of energy absorption by the fluid being obtained close to the source wall. By attaching another similar sonic generator with a tapered horn to the tube wall exactly opposite the first generator, and by operating both in phase from a common or similar electrical source, opposing pressure waves will be transmitted to the fluid stream. If a plurality of such symmetrically opposed generators be similarily attached to the tube wall, and equispaced with respect to one another around the wall perimeter, and operated mechanically and electrically in phase with each other, the whole wall will oscillate radially with extremely high amplitudes, and produce high shear forces which will act upon the fluid inside the tube. Extreme pressures will also be produced at the geometrically central axis of the tube. The resultant of such forces will cause a high velocity shock wave to travel axially along and inside the tube away from the source area. The exponential horns need not be terminated at the point of attachment to the tube, but can be wedge shaped with the long edge of the wedge attached along the tubular length. This structure provides a means for defining the length of the reaction zone.

Referring now to Fig. 1, there is illustrated therein one form of reactor 10 of the present invention. A tube 11 having an inner wall 12 and a duct 13 extending therethrough has formed in the outer wall 14 thereof a pair of grooves 15. The duct 13 in the tube is provided to carry fluids or other materials through the tube and close to grooves 15. The wedge shaped ends 16 of a pair of energy concentrating horns or amplifying means 17 are fastened to the tube, and in the drawings the ends 16 are fitted within the grooves 15 and brazed therein. The portion of the tube lying between the ends 16 of the amplifying means 17 is designated the reaction zone or chamber 18.

The outer ends of each of the horns has fastened thereto a mechanical-electrical transducer element, and in the preferred embodiments this transducer element comprises a piezoelectric cylinder 20 preferably composed of barium titanate, a ceramic material which exhibits marked piezoelectric properties. The inner and outer surfaces of the cylinder 20 are coated with silver paint 21 or some other conductive material, and electrodes 22 and 23 are respectively attached to the inner surfaces 24 and outer surfaces 25 of the cylinders.

Figure 3:
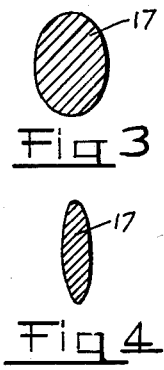
Figure 3 is a cross-sectional view taken along line 3—3 of Fig. 2.
Figure 4:
Figure 4 is a cross-sectional view taken along line 4—4 of Fig. 2.
Figure 2:
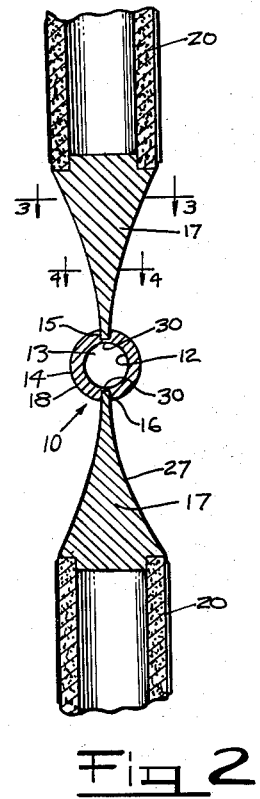
Figure 2 is a cross-sectional view of the embodiment illustrated in Fig. 1 and taken at right angles thereto along line 2—2.

The motion amplifying means 17 positioned between each piezoelectric cylinder 20 and the tube 11 has an external shape or configuration which conforms to an exponential curve 27 in the plane lying transversely to the axis of the tube 14. The exponential curvature or contour is better illustrated in Fig. 2, which shows the small end 16 of the tapered horn or amplifying means 17 inserted within the grooves 15 formed in the tube wall. Figs. 3 and 4 illustrate the shape of the horn at sections taken through the body thereof in Fig. 2, and indicate that the width of the horn as viewed in Fig. 1 remains constant, and that the external curvature or contour of the horn as a whole is smooth.

When an alternating current power source is connected across the internal and external surfaces of the piezoelectric cylinders 20, mechanical vibrations are induced in the cylinders due to the piezoelectric properties thereof. Each cylinder 20 vibrates or oscillates in its length or axial mode as well as in the thickness mode at the frequency of the applied A. C. power source. These vibrations are transmitted to the tapered horns 17 which are fastened to the ends of each of the cylinders 20, and the tapered or exponential contour of each of the horns has the effect of increasing the amplitude of the vibrations as a function of the ratio that the cross-sectional area of the horn portion adjacent the end of the cylinder 20 bears to the cross-sectional area of the end portion 16 of the horn. As has been stated earlier in this description, the oscillatory motion of the ends of the amplifying means 17 is transmitted to the tube wall 14, and more specifically to the portion of the tube wall lying directly between the wedge shaped ends 16 of the amplifying means 17 and the reaction zone 18. As a consequence thereof, the tube wall 14 will be subjected to oscillatory forces directed radially with respect to the tube 11. Since the cylinders 20 are disposed oppositely one another and are operated in phase both electrically and mechanically, the tube wall 14 will be subjected to equal and opposite oscillatory forces which will cause the tube wall 14 to oscillate radially. If the masses of the tapered horns 17 and cylinders 20 and the stiffness of the tube wall 14 under radial compression are properly matched, then over a small range of frequencies, corresponding to the electrical frequencies of the power source, the horn and tube system may be caused to enter into a resonance or near-resonance condition, at which frequencies optimum performance of the reactor will be realized, as heretofore described. In the preferred embodiment, these frequencies will lie in the sonic or ultrasonic range.

The fluid flowing through the duct 13 and passing through the reaction zone 18 will be subjected to sonic or ultrasonic vibrations emanating from the inner wall 12 of the tube, and controlled treatment of the fluid may be realized in zone 18. If it be desired to concentrate more wave energy within the reaction zone 18, additional pairs of transducers 20 and associated amplifying means 17 may be positioned around the reaction zone 18 as heretofore described.

Figure 5:
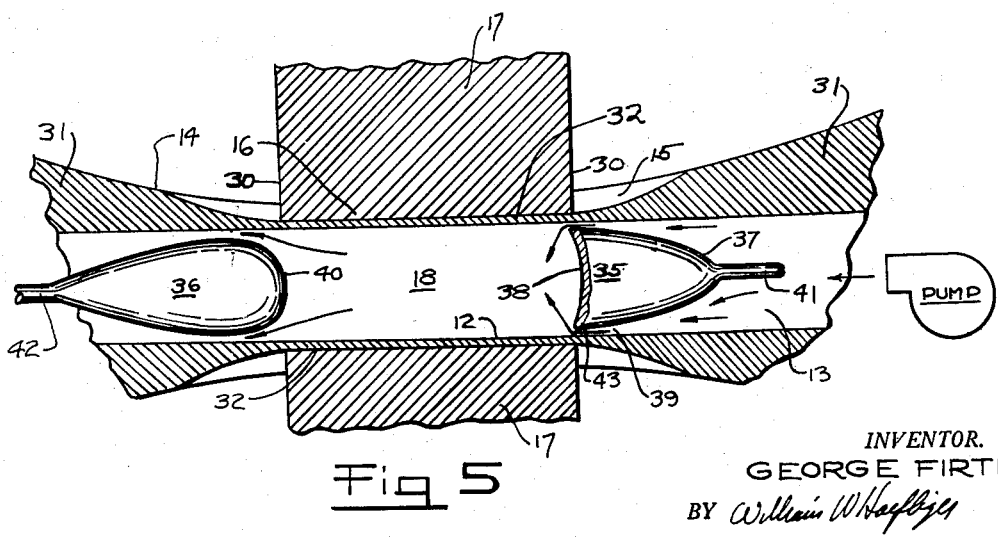
Figure 5 is a detailed cross-sectional view of a reaction zone of the present invention.

In Fig. 5, there is illustrated the portion of the reactor surrounding the reaction zone 18, with additional elements disposed within the duct 13 to achieve more efficient utilization of the sonic or ultrasonic wave energy transmitted to the reaction zone 18.

The tube wall thickness increases continuously to the left and right of the edges 30 of the horns 17, to define relatively thick walled means or wall portions 31 having greater lineal weight than the tube wall portion 32 nearest the ends 16 of the horns or amplifying means 17. The latter tube wall portion 32 is of lesser lineal weight than wall portion 31 and has a minimum thickness consistent with minimum safe strength characteristics to provide for maximum wave energy transfer or penetration to the inner wall 12 of the tube and to the fluid in the reaction zone 18. The tube wall 14 as shown comprises a type of cantilever construction which has for its purpose the provision of a pair of effective masses or weights 31 disposed oppositely at either end of the minimum thickness wall portion 32. The distributed weight of these effective masses is made such that the tube itself becomes an effective spring-mass system which oscillates under the driving force of the radial oscillations of the ends 16 of the horns 17. When the masses of the thick walled portion 32 of the tube are adjusted so that the natural frequency of vibration thereof coincides with the frequency of operation of the reactor, then the radial oscillation or deflection of the thin walled means 32 will be aided and the efficiency of the reactor improved since the thin-walled portion of the tube will be stretched axially at the same time that it is undergoing radial compression exerted by the ends 16 of the horns.

Baffle means or acoustic reflectors including upstream baffle 35 and downstream baffle 36 are also interposed in the duct 13 shown in Fig. 5. The upstream baffle 35 has a smoothly tapered contour 37 facing upstream, and a concave or dished surface 38 facing the reaction zone. The maximum cross-sectional dimension of the baffle 35 is less than the diameter of the duct so that fluid may pass through the annular clearance space 39 close to the inner wall 12 of the tube in flowing into the reaction zone 18. The downstream baffle 36 is streamlined and has a tear drop shape with the convex surface portion 40 thereof having the greatest curvature facing the reaction zone 18. The maximum cross-sectional dimension of the downstream baffle 36 is also somewhat less than the diameter of the duct so that fluid may pass between the baffle surface and the inner wall of the duct and thence downstream from the reaction zone. Each of the baffles has axial position adjustment means attached thereto, comprising rods 41 and 42 attached respectively to the upstream baffle 35 and to the downstream baffle 36. The ends, not shown, of these rods are anchored at screw-type adjusting means which are used to position the baffles axially within the duct.

As fluid approaches the reaction zone under pressure, it is directed outwardly toward the inner wall 12 of the duct by the surface 37 of the upstream baffle 35, and as the fluid passes the lip 43 of baffle 35 it is subjected to violent sonic or ultrasonic acceleration, and the fluid particles are impelled inwardly toward the center of the tube as shown. The ultrasonic waves directed toward the center of the tube and passing through the fluid medium achieve greatest intensity at the center of the tube due to their radial in-phase combination, and as a result subject the fluid stream to wave energy levels which are sufficient to bring about the chemical and physical reactions heretofore mentioned. Longitudinal or axial waves are also set up in the fluid medium, which waves are reflected off the surfaces 38 and 40 of the baffles. The dished surface 38 of the upstream baffle may comprise a paraboloid to cause the axially directed waves to be reflected toward the axis of the tube at a point near the upstream end of the reaction zone 18 to subject the fluid entering the reaction zone to maximum agitation. Furthermore, the axial distance between the surfaces 38 and 40 of the two baffles may be adjusted so as to be some function of the wave length of the axial waves passing through the fluid medium, so that resonance or near resonance conditions may be obtained in the reaction zone.

In Figs. 6 and 7 there is illustrated a complete reactor unit 60. The reactor has eight oppositely disposed transducer elements 61 and horns 62 equispaced radially around a walled reactor tube 63, and held in place by a ring member 64. The tube wall is of cantilever construction as described in connection with Fig. 5. The duct 65 and reaction zone 66 within tube 63 are cylindrically shaped, and a pair of adjustable baffles or acoustic reflectors 67 and 68 are disposed upstream and downstream from the reaction zone 66 within the duct. The construction of these two baffles is identical to baffles 35 and 36 shown in Fig. 5. The upstream baffle 67 has an adjusting rod 69 connected thereto, the opposite end 70 of the rod being threaded within housing member 71 and having joined thereto an axial adjustment knob 72. Similarly, rod 73 connected to downstream baffle 68 is threaded within housing member 74 and has an adjustment knob 75 connected thereto.

A walled member 76 is fitted to the downstream end 77 of walled tube 63 and extends at right angles thereto. Walled member 76 encloses a duct 78 which has positioned therein an orifice plate 79 having an orifice 80 formed therein. The orifice plate 79 is removably secured to the inside wall of the walled member 76 and may be removed through an access chamber 81 having a cap 82 secured thereto. A pump 83 is provided to deliver fluid to be treated to the inlet 84 of another walled member 85 enclosing a duct 86 which connects to the upstream end of duct 65. The pump and orifice combination provide means for controlling cavitation effects in the reaction zone during reactor operation. If cavitation effects in the reaction zone are desired, the orifice plate can be moved to the duct 86 within walled member 85 and a suction pump used to draw fluid from duct 78 in downstream walled member 76, to reduce the fluid pressure in the reaction zone.

Each transducer element 61 illustrated in Figs. 6 and 7 is preferably of the piezoelectric type as heretofore described. Motion amplifying means 62 are positioned between each transducer and the tube wall 87 and securely fastened thereto. The motion amplifying means 62 has a tapered exponentially curved contour in the plane passing through the major axis thereof and perpendicular to the axis of the tube 63, as shown in Fig. 7. The long axis of the end 88 of each of the horns or motion amplifying means is disposed along the tube wall in the axial direction.

Cooling coils 89 are positioned around each of the transducer elements and horn elements to dissipate the heat energy generated in transducer operation. Greater heat transfer efficiency can be obtained by immersing the entire reactor unit in a suitable fluid medium possessing electrical insulating properties, such as oil.

The symmetrical disposition of the ends of the horns around the circumference of the thin walled portion 87 of the tube 63 provides for symmetrical and radial oscillatory deformation of the tube wall when the transducers are operated in electrical and mechanical in-phase operation.

I claim:

1. In a reactor: transducer means; electrical means for inducing periodic deformation of said transducer means; a walled member forming a reaction chamber; and means for transmitting deformation effected therein by said transducer means to said walled member, said means including an energy concentrating member having a large end operatively connected to said transducer means and a small end joined to said walled member, said energy concentrating member having a tapered surface between said large and small ends.

2. In a reactor: piezoelectric transducer means; electrical means for inducing periodic deformation of said piezoelectric transducer means; a walled member forming a reaction chamber; and means for transmitting deformation effected therein by said transducer means to said walled member, said means including an energy concentrating member having a large end operatively connected to said transducer means and a small end joined to said walled member, said energy concentrating member being tapered between said large and small ends.

3. In a reactor: magnetostrictive transducer means; electrical means for inducing periodic deformation of said magnetostrictive transducer means; a walled member forming a reaction chamber; and means for transmitting deformation effected therein by said transducer means to said walled member, said means including an energy concentrating member having a large end operatively connected to said transducer means and a small end joined to said walled member, said energy concentrating member being tapered between said large and small ends.

4. In a reactor: transducer means; electrical means for inducing periodic deformation of said transducer means; a walled member forming a reaction chamber; and means for transmitting deformation effected therein by said transducer means directly to said chamber, said means including an energy concentrating member having a large end joined to said transducer means and a small end embedded in said walled member and in direct communication with said reaction chamber, said energy concentrating member being tapered between said large and small ends.

5. In a reactor: a plurality of transducer means; electrical means for inducing periodic in-phase deformations of said transducer means; a walled member forming a reaction chamber; and means for transmitting deformations effected therein by said transducer means to said walled member, said means including a plurality of vibrational energy concentrating members each of which is operatively connected to one of said transducer means and to a portion of said walled member, each of said energy concentrating members being tapered between said transducer means and said walled member.

6. In a reactor: transducer means; electrical means for inducing periodic deformation of said transducer means; a walled member forming a reaction chamber said walled member including a minimum thickness portion disposed between heavy wall portions spaced at opposite ends of said reaction chamber; and vibrational energy concentrating means including a tapered body operatively connected between said transducer means and said minimum thickness portion of said walled member for transmitting deformation effected therein by said transducer means to said minimum thickness portion of said walled member.

7. In a reactor: transducer means; electrical means for inducing periodic deformation of said transducer means; a walled member forming a reaction chamber; motion amplifying means mechanically coupled to said transducer means for transmitting deformation effected therein by said transducer means to said walled member, said motion amplifying means including an elongated portion having a tapered contour between a large end thereof joined to said transducer means and a small end joined to said walled member; and means for joining said motion amplifying means to said walled member, said means including a groove in said walled member adapted to receive the small end of said elongated portion.

8. In a reactor: transducer means; electrical means for inducing periodic deformation of said transducer means; a walled member forming a reaction chamber, said walled member including a minimum thickness portion disposed between heavy wall portions spaced at opposite ends of said reaction chamber; vibrational energy concentrating means mechanically coupled to said transducer means for transmitting deformation effected therein by said transducer means to said walled member, said energy concentrating means including a tapered member having a small end and a large end; and means for joining the small end of said tapered member to said minimum thickness portion of said walled member.

9. In a reactor: transducer means; electrical means for inducing periodic deformation of said transducer means; a walled member forming a duct; vibrational energy concentrating means mechanically coupled to said transducer means for transmitting deformation effected therein by said transducer means to said walled member, each of said energy concentrating means including a plurality of tapered members each having a small end elongated in the direction of said duct and narrowed at right angles to said duct; and means for joining the small end of each tapered member to said walled member, said means including grooves formed in said walled member for receiving the ends of each said tapered members.

10. In reaction apparatus: a plurality of transducer means; means for inducing periodic in-phase deformations of said transducer means; a walled member forming a duct; and means for transmitting deformations effected therein by said transducer means to said walled member and for amplifying said motion, said means including a tapered body having an end portion elongated in the direction of said duct, said end portion being rigidly joined to said walled member.

11. In reaction apparatus: a plurality of transducer means; means for inducing periodic in-phase deformations of said transducer means; a walled member forming a duct; and means for transmitting deformations effected therein by said transducer means to said duct, said means including a tapered body having an end portion elongated in the direction of said duct, said end portion being supported by said walled member and in communication with said duct.

12. In reaction apparatus: transducer means; electrical means for inducing periodic deformation of said transducer means; a walled member forming a duct; vibrational energy concentrating means including a tapered member having a small end for transmitting deformation effected therein by said transducer means to said duct; and a reaction zone within said duct, said zone including the portion of said duct adjacent said small end of said tapered member.

13. In a reactor: a walled member forming a duct; transducer means for effecting periodic deformations in said walled member; vibrational energy concentrating means disposed between said transducer means and said walled member and operatively connected thereto; a reaction zone within said duct; and baffle means disposed within said duct at opposite ends of said reaction zone with said zone disposed therebetween, said means forming with said walled member an annular entrance passage to said reaction zone and an exit passage therefrom.

14. In a reactor: a walled member forming a duct; transducer means for effecting periodic deformation in said walled member; vibrational energy concentrating means disposed between said transducer means and said walled member and operatively connected thereto; a reaction zone within said duct; and baffle means disposed within said duct, said baffle means being disposed at opposite ends of said reaction zone with said zone disposed therebetween, said means forming with said walled member an annular entrance passage to said reaction zone.

15. In a reactor: a walled member forming a duct; transducer means for effecting periodic deformations in said walled member; vibrational energy concentrating means disposed between said transducer means and said walled member and operatively connected thereto; a reaction zone within said duct; and baffle means disposed within said duct at opposite ends of said reaction zone with said zone disposed therebetween, said baffle means including a baffle having a dished surface facing said reaction zone.

16. In a reactor: a walled member forming a duct; transducer means for effecting periodic deformations in said walled member; vibrational energy concentrating means disposed between said transducer means and said walled member and operatively connected thereto; a reaction zone within said duct; and baffle means disposed within said duct, said baffle means including a baffle having a concave surface facing said reaction zone for causing reflection of longitudinal waves in said reaction zone toward the axis thereof.

17. In a reactor: a walled member forming a duct; transducer means for effecting periodic deformations in said walled member; vibrational energy concentrating means disposed between said transducer means and said walled member and operatively connected thereto; a reaction zone within said duct; and baffle means disposed within said duct at opposite ends of said reaction zone with said zone disposed therebetween, said baffle means including a first baffle having a dished surface facing said reaction zone, and a second baffle having a concave surface facing said reaction zone.

18. In a reactor: a walled member forming a duct, said walled member including a minimum thickness portion; transducer means for effecting periodic deformations in said minimum thickness portion; vibrational energy concentrating means disposed between said transducer means and said walled portion and operatively connected thereto; a reaction zone within said duct adjacent said minimum thickness portion of said walled member; and baffle means disposed within said duct, said baffle means facing said reaction zone at opposite ends thereof, said baffle means including a fluid guiding member adapted to guide fluid flowing toward said reaction zone adjacent said walled member.

19. In a reactor: a walled member forming a duct; a plurality of transducer means for imparting ultrasonic wave energy to said walled member; vibrational energy concentrating means disposed between said transducer means and said walled member and operatively connected thereto; and adjustable baffle means disposed within said duct and at opposite ends of a reaction chamber to which ultrasonic wave energy is to be transmitted.

20. In reaction apparatus: a walled chamber; a reaction zone within said chamber; a plurality of piezoelectric transducer elements disposed around said walled chamber; and wave amplifying means joined to each of said transducer means for conducting ultrasonic wave energy to said reaction zone each of said means including a smoothly tapered body having a small end rigidly joined to a portion of said walled chamber, all of said portions being equally spaced around said reaction zone.

21. In reaction apparatus: a walled chamber; a reaction zone within said chamber; a plurality of magnetostrictive transducer elements disposed around said walled chamber; and wave amplifying means joined to each of said transducer means for conducting ultrasonic wave energy to said reaction zone each of said means including a tapered body having a small end rigidly joined to a wall portion of said chamber, all of said tapered bodies being equispaced around said reaction zone.

22. In a reactor: a walled member forming a duct; a reaction zone within said duct; a plurality of transducer means for imparting ultrasonic wave energy to said reaction zone; baffle means disposed within said duct in spaced relation to the interior walls thereof for directing the flow of fluid in said duct toward said walls and for reflecting wave energy in said zone, said baffle means being disposed at opposite ends of said reaction zone; and means for adjusting the position of said baffle means within said duct with respect to said reaction zone.

23. In a reactor: a walled member forming a duct; a reaction zone within said duct; a plurality of transducer means for imparting sonic wave energy to said reaction zone; vibrational energy concentrating means disposed between said transducer means and said walled member and operatively connected thereto; baffle means disposed within said duct at opposite ends of said reaction zone with said zone disposed therebetween, said baffle means including a first baffle having a dished surface facing said reaction zone and a second baffle having a concave surface facing said reaction zone; and means for adjusting the positions of said first and second baffle means with respect to said reaction zone.

24. In a reactor: a walled member forming a duct; transducer means for imparting periodic deformation to the large end of a tapered motion amplifying member, said member having a small end joined to said walled member for transmitting amplified concentrated wave energy to a small portion of said walled member; a reaction zone within said duct; and orifice means and pump means positioned in said duct for controlling fluid and gaseous pressure within said reaction zone to control the rate of reaction of fluid flowing through said reaction zone.

25. In a reactor: a walled member forming a duct; transducer means for imparting periodic deformation to said walled member; vibrational energy concentrating means disposed between said transducer means and said walled member and operatively connected thereto; a reaction zone within said duct; baffle means disposed within said duct outside said reaction zone at opposite ends thereof, said baffle means including a fluid guiding member adapted to guide fluid flowing toward said reaction zone adjacent said walled member; and orifice means disposed within said duct to control the rate of fluid flow through said reaction zone.

26. In a reactor: a walled member including a first portion forming a reaction chamber and including second portions disposed at opposite ends of said reaction chamber, the lineal weight of said second portions being greater than the lineal weight of said first portion; a plurality of transducer means; electrical means for inducing periodic deformation of said transducer means; and means for transmitting periodic deformation effected therein by said transducer means to said first portion of said walled member, said means including an elongated tapered energy concentrating member having a large end operatively connected to said transducer means and a small end joined to said first portion of said walled member; whereby said first portion of said walled member may be compressed and expanded in timed relation to the periodic deformation of said transducers, and said walled member may be excited to oscillate in the axial mode to assist said expansion and compression.

27. In a reactor: transducer means; electrical means for inducing periodic deformation of said transducer means; a walled member including a first portion forming a reaction chamber and including second portions disposed at opposite ends of said reaction chamber, the lineal weight of said second portions being greater than the lineal weight of said first portion; and means for transmitting periodic deformation effected therein by said transducer means to said first portion of said walled member and means including an elongated tapered energy concentrating member having a large end operatively connected to said transducer means and a small end joined to said first portion of said walled member; whereby the walled member may be excited to oscillate in the axial mode.

28. In the treatment of fluids, the continuous process which consists in: passing the fluids through a walled duct between the inner wall thereof and wave reflecting baffle means positioned in said duct, and thence into a reaction chamber; subjecting said fluids passing adjacent said wall and into the reaction chamber to ultrasonic periodic wave energy and to wave energy reflected from said baffle means; and removing said fluids from said reaction chamber.

29. Wave energy treatment apparatus for fluids, comprising tubular means forming a duct having an inlet and an outlet for passing fluid therethrough, said duct having a metallic wall portion surrounding a reaction zone, a plurality of piezoelectric transducers disposed externally of said duct, said transducers being electrically deformable toward and away therefrom, means mounting said transducers around said reaction zone in spaced relation to said wall portion, a plurality of vibrational energy concentrating members interposed between said transducers and said wall portion for transmitting vibrational energy therebetween, each of said members having a large end connected to one of said transducers, a small end connected to said wall portion, and a tapered metallic body therebetween, and electrical means connected across each of said transducers for applying an alternating potential thereto adapted to effect a periodic deformation thereof from which vibrational energy is derived for transmission to said reaction zone through said energy concentrating members and said wall portion.

30. The invention as defined in claim 29 in which each of said transducers comprises a cylinder having a diameter greater than the diameter of said wall portion surrounding said reaction zone.

31. The invention as defined in claim 30 in which said transducers are disposed in a plane extending transversely through said reaction zone, and in which said energy concentrating members are tapered in said plane, said small ends thereof being elongated in directions parallel to the axis of said zone.

32. The invention as defined in claim 29 in which said wall portion has a stiffness related to the masses of said transducer and energy concentrating members such that said apparatus may be operated at substantially resonance conditions over a limited frequency range of said alternating potential.

References Cited in the file of this patent

UNITED STATES PATENTS

| | | |
|---|---|---|
| 2,478,207 | Robinson | Aug. 9, 1949 |
| 2,566,984 | Firth | Sept. 4, 1951 |
| 2,573,168 | Mason et al. | Oct. 30, 1951 |
| 2,578,505 | Carlin | Dec. 11, 1951 |
| 2,585,103 | Fitzgerald | Feb. 12, 1952 |